W. LOREY.
Mowing-Machine.
No. 162,082. Patented April 13, 1875.
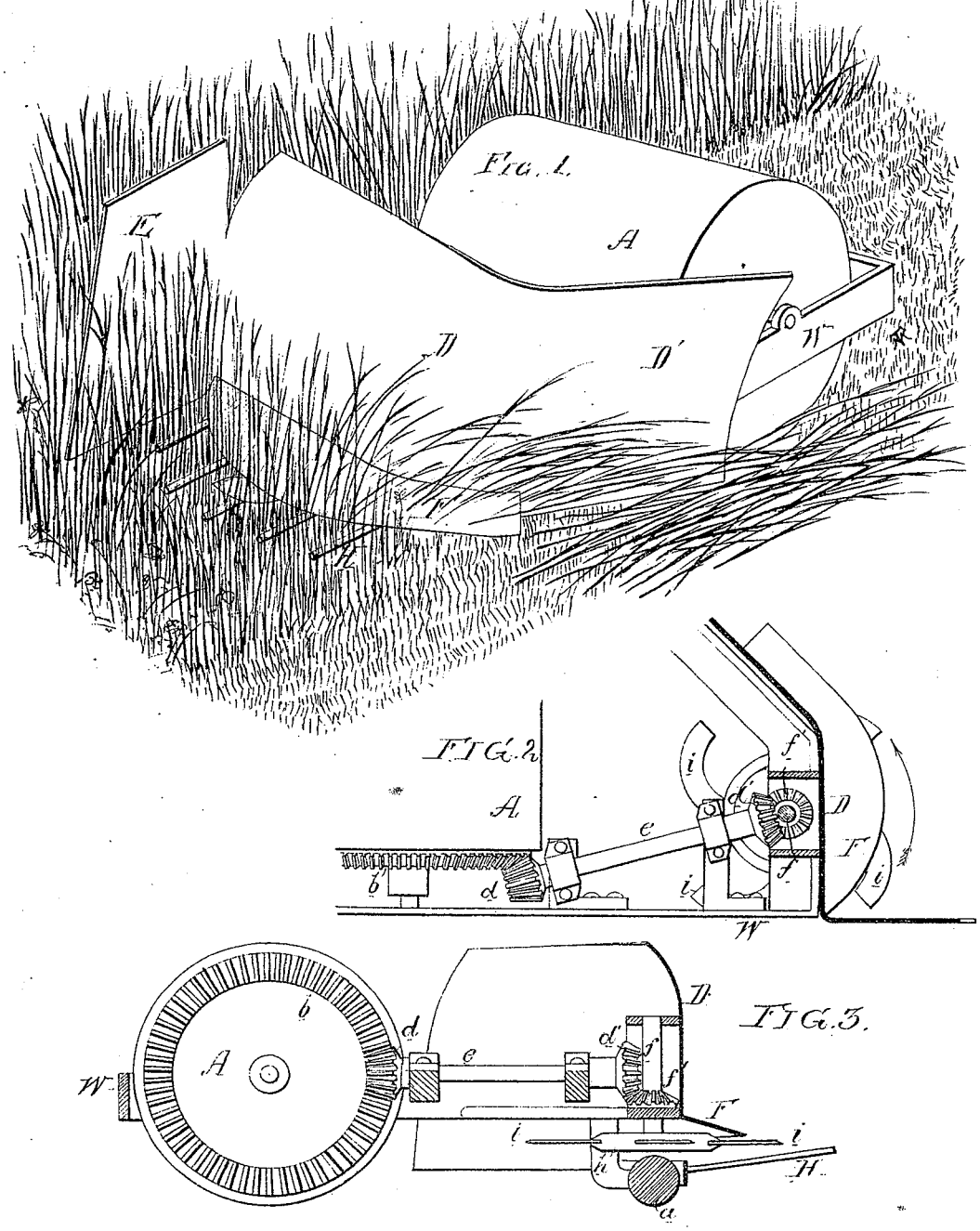
Witnesses, Hubert Howson
Thomas McIlvain
Wm Lorey
by his Attys.
Howson and Son

UNITED STATES PATENT OFFICE.

WILLIAM LOREY, OF PHILADELPHIA, PENNSYLVANIA.

IMPROVEMENT IN MOWING-MACHINES.

Specification forming part of Letters Patent No. 162,082, dated April 13, 1875; application filed January 26, 1875.

*To all whom it may concern:*

Be it known that I, WILLIAM LOREY, of Philadelphia, Pennsylvania, have invented certain Improvements in Mowing-Machines, of which the following is a specification:

The object of my invention is to construct a simple, cheap, and effective mowing-machine; and this object I attain in the manner which I will now proceed to describe, reference being had to the accompanying drawing, in which—

Figure 1 is a perspective view of the machine; Fig. 2, a vertical section of the same, and Fig. 3 a sectional plan.

A is the driving-wheel or roller which supports the rear end of the machine, and which turns in suitable bearings in the frame-work W, a roller, $a$, supporting the front end of the machine. Attached to one end of the roller A is a bevel-wheel, $b$, which gears into a pinion, $d$, on a shaft, $e$, the latter turning in bearings on the frame-work, the shaft being provided at its front end with a bevel-wheel, $d'$, gearing into a similar wheel, $f'$, attached to a vertical shaft, $f$, to the lower end of which is secured the disk $h$, carrying the cutting-knives $i$. A guard, D, constructed preferably of sheet-iron, is attached to the front of the frame-work, and is curved rearward and outward at one side, so as to form a deflecting-screen, D', which throws the grass or grain to one side as fast as it is cut by the revolving knives, as shown in Fig. 1. At the opposite side of the machine the guard D is bent abruptly forward, so as to form a guide, E, for so determining the direction that the cutting of a straight swath of the proper width may be insured. A supplementary plate, F, is attached to the lower edge of the main guard-plate, and projects over the knives $i$, in order to prevent the clogging of the same and of the driving mechanism by the severed grass. A series of bars, H, project outward from the front edge of the frame-work, close to the ground, for the purpose of removing stones or other obstructions, which would injure the knives if permitted to come in contact with them.

It will be observed, on reference to Fig. 2, that the cutting-blades $i$ rotate freely beneath the guard-plate F, so as to have a shearing effect on the grass or grain. This arrangement enables me to dispense with the usual "dead plate," and to thus considerably simplify the construction of the machine.

My invention, although intended for mowing-machines of small size—such as lawn or hand mowers—can, it will be evident, be applied with a good effect to mowing-machines of a larger class.

I claim as my invention—

1. The combination, in a mowing-machine, of the revolving cutters $i$ and a plate or guard, one portion, D, of which is above the cutters, while the end D' extends beyond the cutters at one side and toward the rear, so as to deflect the grass or grain to such side as soon as severed, all as set forth.

2. The guard for mowing-machines, consisting of the bent plate D D', projecting end E, and inclined flange F, all as specified.

In testimony whereof I have signed my name to this specification in the presence of two subscribing witnesses.

WILLIAM LOREY.

Witnesses:
HUBERT HOWSON,
HARRY SMITH.